(No Model.)

W. E. & J. H. CURTIS.
TAP AND FAUCET CONNECTION FOR BEER AND OTHER BARRELS.

No. 335,743. Patented Feb. 9, 1886.

Witnesses:
Walter E. Lombard.
William H. Chapman.

Inventors:
William E. Curtis,
John H. Curtis,
by N. C. Lombard
Attorney.

UNITED STATES PATENT OFFICE.

WILLIAM E. CURTIS AND JOHN H. CURTIS, OF TAUNTON, MASSACHUSETTS.

TAP AND FAUCET CONNECTION FOR BEER AND OTHER BARRELS.

SPECIFICATION forming part of Letters Patent No. 335,743, dated February 9, 1886.

Application filed August 1, 1885. Serial No. 173,225. (No model.)

*To all whom it may concern:*

Be it known that we, WILLIAM E. CURTIS and JOHN H. CURTIS, both of Taunton, in the county of Bristol and State of Massachusetts, have jointly invented certain new and useful Improvements in Taps and Faucet Connections for Beer and other Barrels, of which the following, taken in connection with the accompanying drawings, is a specification.

Our invention relates to that class of taps and faucet connections for beer and other barrels in which a bushing is permanently affixed to the barrel before the barrel is filled with beer or other liquid, and provided with means for connecting thereto a faucet, all so arranged that the act of connecting the faucet thereto shall open communication with the interior of the barrel; and it consists in certain novel features of construction, arrangement, and combination of parts, which will be best understood by reference to the description of the drawings, and to the claims to be hereinafter given.

Figure 1:
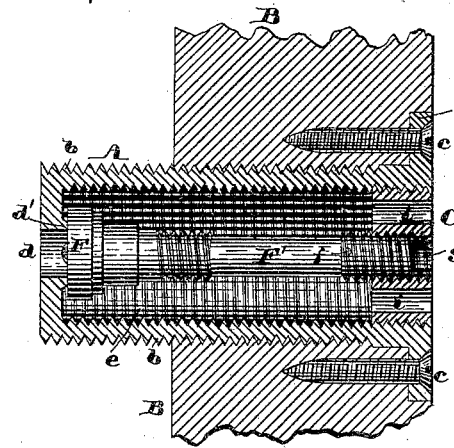
Figure 2:
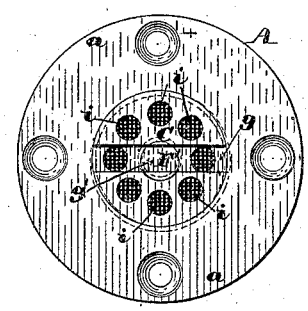
Figure 3:
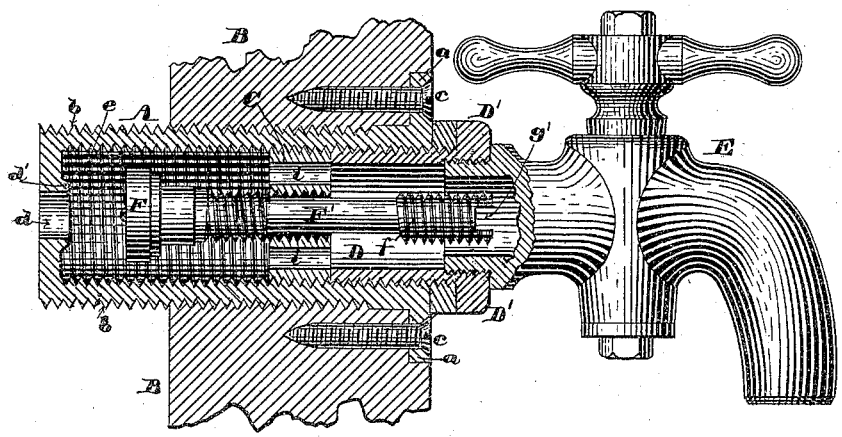
Figure 4:
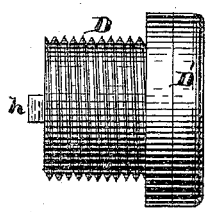
Figure 5:
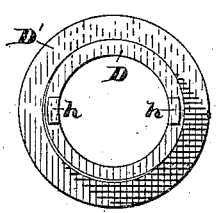

Figure 1 of the drawings is a section through a portion of a barrel-head and our improved tap or bushing, the cutting plane being longitudinally through the axis of said tap or bushing, the valve being in position to close the discharge-orifice. Fig. 2 is an end elevation of the tap removed from the barrel-head. Fig. 3 is a section similar to Fig. 1, but showing the faucet applied to the bushing and the valve of the bushing opened. Figs. 4 and 5 are respectively a side elevation and an end view of the nut-operating sleeve which receives the faucet.

In the drawings, A is a cylindrical plug or bushing, provided with the flange $a$ and the male screw-thread $b$, by which and the screws $c$ $c$ it is secured in position in the barrel-head B, as shown in Figs. 1 and 3. The bushing A has its inner end closed except the small central orifice, $d$, around which, upon the interior of said bushing, is formed the annular projecting valve-seat $d'$, and is also provided with the female screw-thread $e$, to receive the nut C and the sleeve D or faucet E, as may be desired.

F is a valve, provided with the stem or rod F', having formed thereon for a portion of its length, at its outer end, the male screw-thread $f$, to fit a corresponding female thread in the nut C, a portion of said stem between said thread and the valve F being made smooth or without thread, and of such a diameter that said stem may move freely endwise through the nut C when said nut is unscrewed from the inner end of the thread $f$, as shown in Fig. 3. A rectangular slot, $g$ $g'$, is cut transversely across the outer ends of the nut C and valve-stem F', so arranged that when the nut C is screwed upon the stem F till the outer face of the nut and the end of the stem coincide, or are in the same plane, the sides of the slot $g'$ in the end of the stem shall be in line with and match or form continuations of the sides of the slot in the outer face of said nut, so that by using a screw-driver adapted to fit said slot, and of a width nearly equal to the diameter of the nut C, the nut and stem may be revolved together to screw the nut C into the bushing A till the outer face of the nut C is flush with the outer face of the bushing A, and the valve F is firmly seated upon the seat $d'$, and the orifice $d$ is effectually closed, as shown in Fig. 1. The sleeve D is provided at one end with the flange or collar D', and upon its other end with the two ears or lugs $h$ $h$, adapted to fit the slot $g$ in the nut C, and act thereon as a means of revolving the nut C, to screw it farther into the bushing A, so as to run it off from the thread $f$ of the stem F', as shown in Fig. 3. The sleeve D is threaded exteriorly, to fit the interior thread in the bushing A, and interiorly to fit the thread on the faucet, as shown. The nut C is provided with a series of perforations, $i$, extending through the same parallel to its axis, through which the contents of the barrel may flow to the faucet E when the valve is opened. The thread on the valve-stem F' and the thread in the interior of the bushing A must be of the same pitch, so that the nut C may be revolved within the bushing and about the stem without moving the valve F when the sleeve D is screwed into the bushing A. The sleeve D is screwed firmly to the faucet or cock E, so as to virtually form a part thereof before it is screwed into the bushing, and may be dispensed with by making the screw-stem of the faucet or cock of a diameter to fit the bushing A, and providing it with the lugs $h$ $h$, to engage with the slot $g$ in the nut C, the sleeve being necessary only to re-enforce or increase the diameter of the ordinary faucet or cock when too small for the bushing A, and to make the desired connection between the faucet and the nut C.

Figure 6:
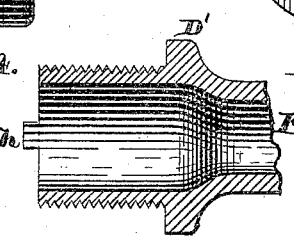

The operation of our invention is as follows: The bushing A being secured in position in the barrel before it is filled, and the nut C being screwed upon the valve-stem F′ till their slotted ends are flush with each other, and the slots $g\ g'$ in said parts coincide, the nut C is then screwed into the bushing A by means of a screw-driver fitted to the slots $g\ g'$, so as to revolve the stem F′ with the nut until the valve F is firmly seated upon the seat $d'$, when the barrel may be filled with beer or other liquid without danger of leakage. When it is desired to draw the contents of the barrel, an ordinary faucet or cock with the sleeve D screwed thereon, or a faucet having its screw end formed as shown in Fig. 6, is screwed into the bushing A by inserting the lugs $h\ h$ in the slots $g$ of the nut C, so as to compel the nut C to revolve with the faucet until the faucet or sleeve is brought to a bearing upon the outer end of the bushing, at which time the nut C will have left the thread $f$ of the valve-stem F, thereby releasing the valve F, so that the pressure in the barrel will move the valve into the position shown in Fig. 3, and the contents of the barrel may then be drawn at pleasure by simply turning the plug of the faucet or cock in a well-known manner.

What we claim as new, and desire to secure by Letters Patent of the United States, is—

1. The bushing A, provided with the valve-seat $d'$ and female screw-thread $e$, in combination with the valve F, the valve-stem F′, provided with the male screw-thread $f$ and the slot $g'$, and having the middle portion thereof reduced in diameter and threadless, and the perforated nut C, provided with male and female screw-threads of the same pitch, all arranged and adapted to operate substantially as and for the purposes described.

2. The bushing A, provided with the valve-seat $d'$ and female screw-thread $e$, in combination with a valve having a screw-threaded stem provided with a slot in its end, a perforated nut provided with male and female screw-threads of the same pitch and a radial slot, and a faucet or cock provided with a male screw-thread to fit the female screw-thread in the bushing, and with two lugs to engage with the slot in the nut, substantially as and for the purposes described.

In testimony whereof we have signed our names to this specification in the presence of two subscribing witnesses.

WILLIAM E. CURTIS.
JOHN H. CURTIS.

Witnesses:
D. L. MITCHELL,
EDWARD S. CALHOUN.